Aug. 24, 1926.  
J. F. R. TROEGER  
1,597,300  
EXHIBITION SCREEN  
Filed May 2, 1921
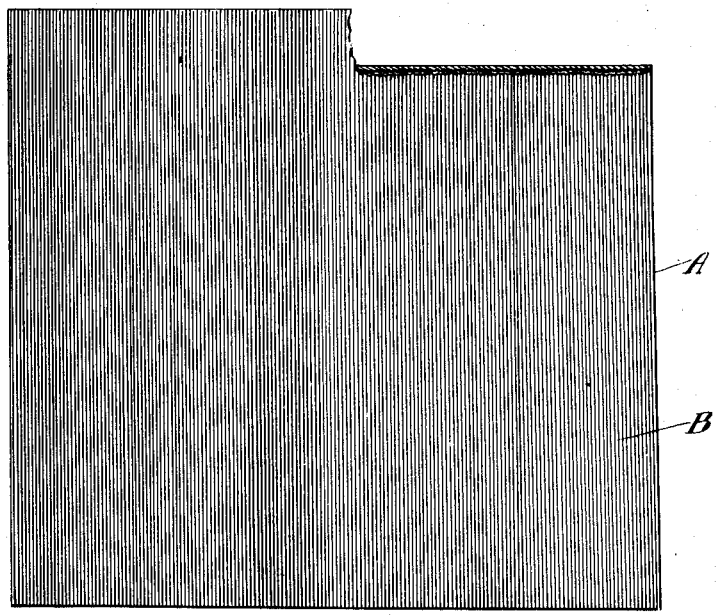
Fig. 1,
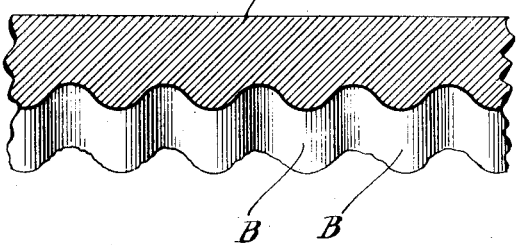
Fig. 2,
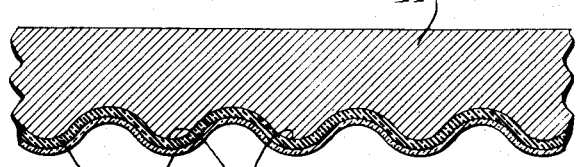
Fig. 3,
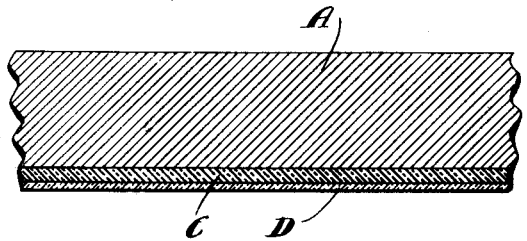
Fig. 4,
INVENTOR  
John F. R. Troeger  
BY  
ATTORNEY Patented Aug. 24, 1926.

1,597,300

UNITED STATES PATENT OFFICE.

JOHN F. R. TROEGER, OF NEW YORK, N. Y.

EXHIBITION SCREEN.

Application filed May 2, 1921. Serial No. 466,045.

This invention relates to exhibition screens for use with picture projecting apparatus.

My invention is especially adapted for use with a projector situated behind the display surface of the screen.

I have discovered that a more perfect reproduction of the picture projected can be produced by intercepting the rays of light which form the picture by the use of a very thin semi-opaque film. I have also discovered that this film can be most practically and effectively produced by either laying it on or embedding it in the body of a screen made of a transparent or nearly transparent material. I have also discovered that a surface having very prefectly formed corrugations of sinusoidal cross section extending vertically prevent distortion when the picture is viewed obliquely and from experiments have learned that 26 corrugations or more per lineal inch of screen gives the best results.

My invention therefore is directed to the embodiment of means for producing a screen of this character. For this purpose I use, as one means, a sheet of transparent material or transparent to a degree necessary to procure the results hereinafter set forth, and having the side exposed to the audience, hereinafter referred to as the display side coated with a very thin translucent film or a film more opaque then the material of which the body of the screen is formed in order that the picture may be produced on the film and not on the body of the screen, and whereby very little of the projected light will be absorbed or lost in the body portion of the screen but will be effective in producing a picture on the film of maximum brightness and definition.

I first provide the body portion of the screen with the corrugations therein and afterward coat the corrugations with a translucent material such as a very thin varnish that will not fill the corrugations but simply coat their surfaces, or if the screen is made without the corrugations, the varnish may be applied in a heavier coat.

A transparent coating of very thin elastic varnish may then be applied to protect the translucent film from abrasion in handling or cleaning.

Referring to the drawings,

Fig. 1 is a view illustrating the display side of the screen;

Fig. 2 is a view showing a cross section and form of the corrugations on an enlarged scale;

Fig. 3 is a cross section illustrating the body of the screen and the translucent coating or embodied film and protective coating referred to;

Fig. 4 illustrates a screen without the corrugations.

A indicates the body portion of the screen.

B indicates the form of the corrugations.

C indicates the translucent film.

D indicates the protective transparent coating.

The body of the screen may be made of glass, or any suitable transparent material, but I prefer to make it of a compound that it is tough and flexible and which is fully described in the United States patent granted to me on August 24, 1915, No. 1,151,502, which described a composition of gelatin and glycerine suitable for the purpose, as it can be made in a thin strong sheet that can be bent to form a roll without injury.

The above description is considered ample for those skilled in this art and therefore further description is deemed unnecessary, in view of the further specifications set forth in the claims.

Having thus described my invention, I claim as new:—

1. A screen for displaying pictures through a transparent body portion having a film on its display side of less transparency than that of the body portion and relatively of less thickness and sinusoidal corrugations formed in its display side.

2. A screen for displaying pictures comprising a transparent body portion formed with a smooth uniformly corrugated surface on one side thereof and a film coating following the surface of said corrugations to form a surface on which to display a picture.

3. A screen for displaying pictures comprising a transparent body portion formed with corrugated surface on one side thereof and a film coating following the surface of said corrugations to form a surface on which to display a picture, and a coating of transparent material covering said film and following the contour of said corrugations.

4. A screen for displaying pictures comprising a transparent body portion formed with a corrugated surface of sinusoidal form on one side thereof and a film coating following the surface of said corrugations to form a surface on which to display a picture.

5. A screen for displaying pictures comprising a transparent body portion formed with a corrugated surface of sinusoidal form on one side thereof and a film coating following the surface of said corrugations to form a surface on which to display a picture and a coating of transparent material covering said films and following the contour of said corrugations.

6. A screen for displaying pictures comprising a substantially transparent body portion of flexible material having one side formed flat and the opposed side formed with a plurality of sinusoidal corrugations extending vertically thereof and having upwards of twenty-six per lineal inch of width and a coating of less transparency and practically even thickness covering said corrugations.

7. A screen for displaying pictures comprising a substantially transparent body portion of flexible material having one side formed flat and the opposed side formed with a plurality of sinusoidal corrugations extending vertically thereof and having upwards of twenty-six per lineal inch of width and a coating of less transparency and practically even thickness covering said corrugations, and a transparent coating of even thickness covering said last named coating.

8. A screen for displaying pictures comprising a substantially transparent body portion having one side formed flat and the opposed side formed with a plurality of sinusoidal corrugations extending vertically thereof and having upwards of twenty-six per lineal inch of width and a coating of less transparency and practically even thickness covering said corrugations.

9. A screen for displaying pictures comprising a substantially transparent body portion having one side formed flat and the opposite side formed with a plurality of sinusoidal corrugations extending vertically thereof and having upwards of twenty-six per lineal inch of width and a translucent coating of less transparency and practically even thickness covering said corrugations.

10. A screen for displaying pictures comprising a body portion of transparent material, one side of said screen being formed with a smooth, uniformly corrugated surface, and a relatively thin translucent film located adjacent said side, and disposed beneath said surface.

11. A screen for displaying pictures comprising a body portion of transparent material, one side of said screen being formed with a smooth, uniformly corrugated surface, and a relatively thin translucent film located adjacent said side, said film being disposed beneath said surface, and arranged to follow the contour of said corrugations.

12. A screen displaying pictures comprising a body portion of transparent material, having one side formed with sinusoidal corrugations, said body portion having a translucent material comparatively thin in cross-section incorporated therewith to follow the sinusoidal contour of said corrugations.

13. A screen for displaying pictures comprising a body portion of transparent material, said body portion having a plane face on the side facing the projector and a corrugated face on the side facing the audience, said corrugations being sinusoidal and extending vertically, a semi-opaque film of even thickness covering said corrugations and a protective transparent coating covering the film.

Signed at New York city, in the county of Kings and State of New York, this 26th day of April, 1921.

JOHN F. R. TROEGER.